US008897022B2

(12) United States Patent
Liang et al.

(10) Patent No.: US 8,897,022 B2
(45) Date of Patent: Nov. 25, 2014

(54) FIXING MECHANISM AND ELECTRONIC DEVICE HAVING THE SAME

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 284 days.

(21) Appl. No.: 13/449,520

(22) Filed: Apr. 18, 2012

(65) Prior Publication Data

US 2012/0268902 A1 Oct. 25, 2012

(30) Foreign Application Priority Data

Apr. 22, 2011 (TW) .............................. 100114061 A

(51) Int. Cl.
*H05K 7/00* (2006.01)
*G06F 1/16* (2006.01)
(52) U.S. Cl.
CPC .................................... *G06F 1/1679* (2013.01)
USPC ............................ 361/747; 361/801; 361/802
(58) Field of Classification Search
USPC ................. 361/747, 801–802, 807, 809–810; 312/223.1, 223.2; 335/205–207
See application file for complete search history.

(56) References Cited

U.S. PATENT DOCUMENTS

| 6,517,129 | B1 | 2/2003 | Chien et al. | |
| 6,698,070 | B2* | 3/2004 | Chen | 24/303 |
| 6,891,722 | B2* | 5/2005 | Chen et al. | 361/679.55 |
| 7,332,990 | B2* | 2/2008 | Lo et al. | 335/205 |
| 8,684,422 | B2* | 4/2014 | Liang et al. | 292/80 |
| 2005/0236848 | A1 | 10/2005 | Kim | |
| 2012/0287595 | A1* | 11/2012 | Liang et al. | 361/810 |
| 2014/0043743 | A1* | 2/2014 | Liang | 361/679.09 |

FOREIGN PATENT DOCUMENTS

| CN | 101771137 A | 7/2010 |
| CN | 102024487 A | 4/2011 |
| TW | M343907 | 11/2008 |

OTHER PUBLICATIONS

Office action of counterpart Chinese application No. 201110130046.1 dated Feb. 25, 2014 along with an English translation of sections marked in office action.
Office action of counterpart Taiwanese application No. 100114061 dated Sep. 24, 2013, along with an English translation of sections marked in office action.
Office action to Chinese Counterpart Application No. 201110130046 dated Aug. 28, 2014 along with an English translation of sections marked in office action.

* cited by examiner

*Primary Examiner* — Hung S Bui
(74) *Attorney, Agent, or Firm* — Whyte Hirschboeck Dudek S.C.

(57) ABSTRACT

A fixing mechanism for fixing a magnetic element on a base wall includes a frame, a retaining member, and a blocker. The frame is adapted to be connected to and is adapted to cooperate with the base wall to define a receiving space for receiving the magnetic element, and an opening communicating with the receiving space for entry of the magnetic element into the receiving space along a first assembly direction. The retaining member is adapted to be connected to the base wall in proximity to the frame. The blocker is engaged to the retaining member, and blocks the opening.

22 Claims, 11 Drawing Sheets

FIXING MECHANISM AND ELECTRONIC DEVICE HAVING THE SAME

CROSS REFERENCE TO RELATED APPLICATION

This application claims priority of Taiwanese Patent Application No. 100114061 filed on Apr. 22, 2011, the disclosure of which is incorporated herein by reference.

BACKGROUND OF THE INVENTION

1. Field of the Invention

The invention relates to a fixing mechanism and an electronic device having the same, and more particularly to a fixing mechanism for fixing a magnetic element on a base wall and an electronic device having the same.

2. Description of the Related Art

In a magnet fixing structure and a notebook computer disclosed in Taiwanese Patent No. M348452, the magnet fixing structure includes a base wall, two opposite first lateral walls having bottom ends connected to the base wall, and a second lateral wall having a bottom end connected to the base wall and two opposite lateral ends connected respectively to one lateral ends of the first lateral walls. The first and second lateral walls cooperatively define a receiving space for receiving a magnet. An inverted U-shaped wall has two opposite ends connected to the base wall, and includes two opposite arms connected respectively to the other lateral ends of the first lateral walls. The inverted U-shaped wall defines an entry hole for entrance of the magnet into the receiving space. When the magnet is inserted into the receiving space via the entry hole, one of the first lateral walls deforms resiliently and cooperates with the other first lateral wall to clamp therebetween the magnet.

However, because only the first lateral walls cooperatively clamp therebetween the magnet, if the notebook computer falls down accidentally or receives an external impact, the magnet is easily detached from the clamping of the first lateral walls, and moves out of the receiving space via the entry hole. Thus, the aforesaid magnet fixing structure cannot stably fix the magnet.

SUMMARY OF THE INVENTION

Therefore, an object of the present invention is to provide a fixing mechanism that has a simple structure to reduce manufacturing costs and assembly time thereof and that can stably fix a magnetic element on a base wall.

The purpose of this invention and the solution to the problems of the prior art are achieved through employment of the below technical means. According to one aspect of disclosure of the present invention, a fixing mechanism for fixing a magnetic element on a base wall comprises a frame, a retaining member, and a blocker.

The frame is adapted to be connected to and is adapted to cooperate with the base wall to define a receiving space for receiving the magnetic element, and an opening communicating with the receiving space for entry of the magnetic element into the receiving space along a first assembly direction. The retaining member is adapted to be connected to the base wall in proximity to the frame. The blocker is engaged to the retaining member, and blocks the opening.

The purpose of this invention and the solution to the problems of the prior art may also be achieved through employment of the below technical means.

The retaining member includes two spaced-apart retainers disposed in proximity to the opening and engaged to the blocker.

A receiving channel is formed between the retainer and the frame. The blocker is received in the receiving channel along a second assembly direction that is transverse to the first assembly direction.

The blocker includes a first block portion received in the receiving channel and adapted to abut against the magnetic element, and two second block portions respectively projecting from two opposite sides of the first block portion. Each second block portion abuts against one of inner and outer faces of a respective one of the retainers.

Each retainer includes a guide plate for guiding the magnetic element to move toward the receiving space. The guide plate is formed with an engaging hole. Each second block portion has a projection engaged to the engaging hole.

The fixing mechanism further comprises a pair of spaced-apart guide blocks adapted to be connected to the base wall for guiding the magnetic element to move toward the receiving space.

Each retainer includes an arm portion adapted to be connected to the base wall, and a hook portion protecting from one end of the arm portion away from the opening. The blocker further includes two engaging hooks projecting respectively from the two opposite sides of the first block portion adjacent to the second block portions, respectively. The engaging hooks respectively engage the hook portions of the retainers. Each second block portion abuts against the inner face of the respective one of the retainers.

Each retainer includes an arm portion adapted to be connected to the base wall, and a hook portion protecting from one end of the arm portion toward the opening. The first block portion is cylindrical. Each second block portion is configured as a circular flange projecting outwardly and radially from one end of the first block portion and abutting against the outer face of the respective one of the retainers.

Each retainer includes a guide plate for guiding the magnetic element to move toward the receiving space. The guide plate of each retainer is formed with a through hole. One of the retainers further includes a threaded nut fixed to an outer face of the guide plate. The blocker includes a threaded shank that extends through the through holes in the guide plates of the retainers and that engages the threaded nut, and a head connected to one end of the threaded shank and abutting against an outer face of the guide plate of the other one of the retainers. The threaded shank blocks the opening, and is adapted to abut against the magnetic element.

The retainer is spacedly aligned with the opening and is formed with a screw hole. The blocker includes a limiting hole. The fixing mechanism further comprises a fastener that extends through the limiting hole and that engages the screw hole to fix the blocker to the retainer.

The fixing mechanism further comprises two spaced-apart guide blocks connected to two opposite sides of the frame for guiding the magnetic element to move toward the receiving space. The guide blocks abut respectively against two opposite sides of the blocker.

Another object of the present invention is to provide an electronic device having a fixing mechanism. The fixing mechanism has a simple structure that can reduce manufacturing cost and assembly hours thereof and that can stably fix a magnetic element to prevent the same from falling off.

According to another aspect of disclosure of the present invention, an electronic device having a fixing mechanism includes a first body and a second body.

The first body includes a magnetically attractive component. The second body is connected pivotally to and covers openably the first body. The second body includes a base wall, a magnetic element attracted magnetically to the magnetically attractive component when the second body covers the first body, and a fixing mechanism. The fixing mechanism includes a frame, a retaining member, and a blocker. The frame is connected to and cooperates with the base wall to define a receiving space that receives the magnetic element, and an opening communicating with the receiving space. The magnetic element is moved along a first assembly direction into the receiving space through the opening. The retaining member is connected to the base wall in proximity to the frame. The blocker is engaged to the retaining member, and blocks the opening.

Through the aforesaid technical means, the advantage and efficiency of the electronic device having the fixing mechanism of the present invention reside in that, through the simple structure of the fixing mechanism, manufacturing costs and assembly time thereof can be reduced. Further, the fixing mechanism can stably fix the magnetic element in the receiving space, thereby preventing removal of the magnetic element from the receiving space.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Figure 1:
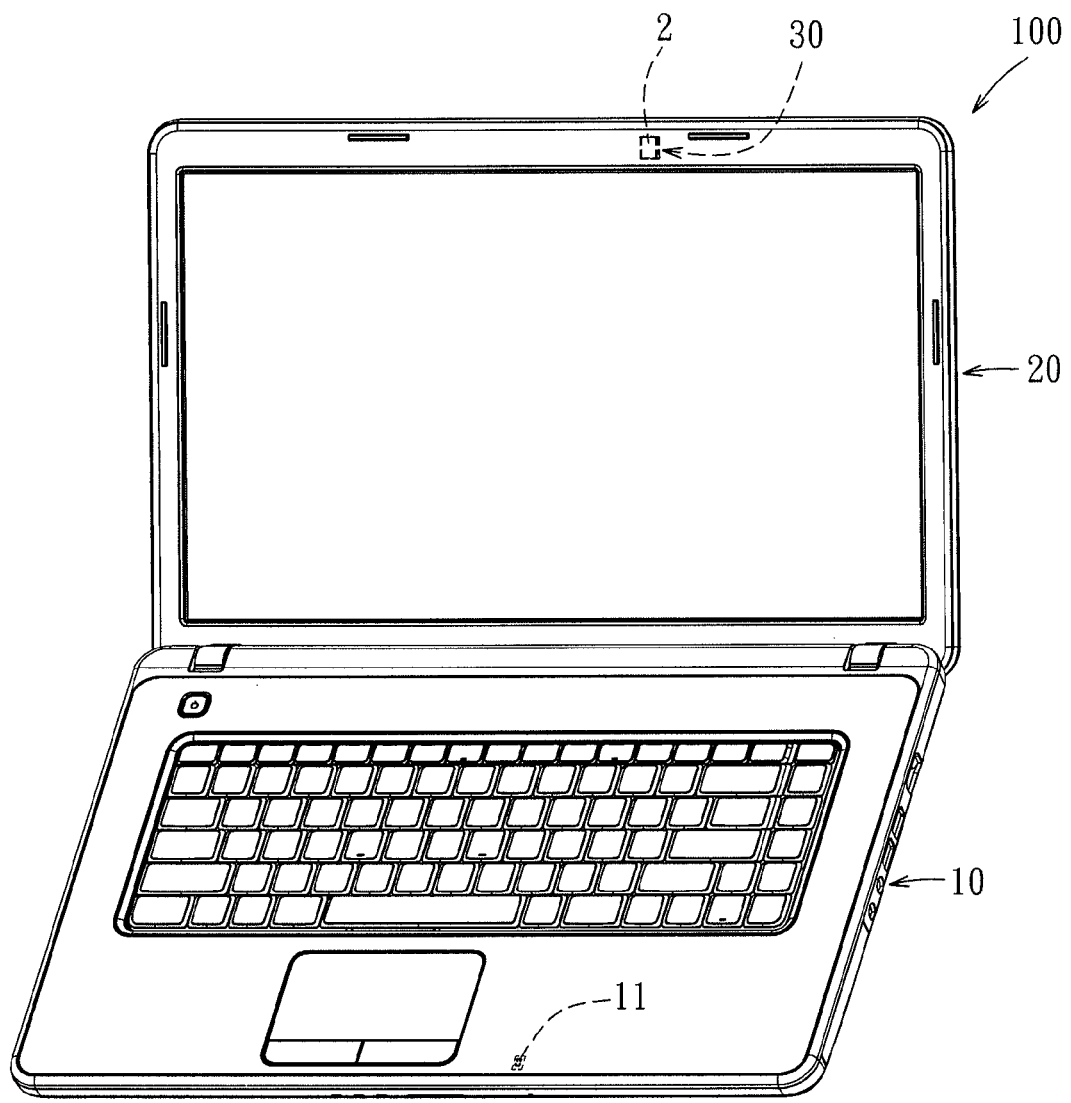
FIG. 1 is a perspective view of an electronic device according to the first embodiment of the present invention.

The above-mentioned and other technical contents, features, and effects of this invention will be clearly presented from the following detailed description of five embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Referring to FIGS. 1 to 4, an electronic device 100 according to the first embodiment of the present invention comprises a first body 10, and a second body 20 connected pivotally to a lateral side of the first body 10. In this embodiment, the electronic device 100 is exemplified as a notebook computer. Alternatively, the electronic device 100 may be a mobile phone or a personal digital assistant (PDA).

Figure 2:
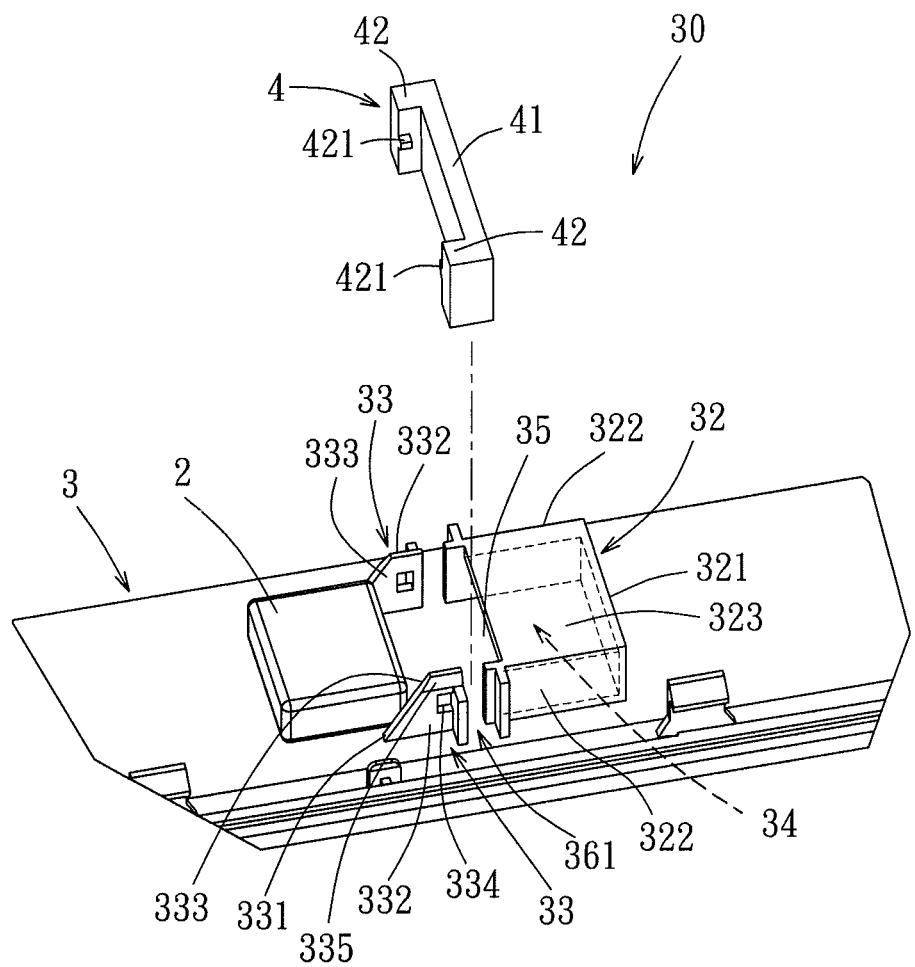
FIG. 2 is a partially exploded perspective view of a fixing mechanism of the first embodiment.

With reference to FIGS. 1 and 2, the first body 10, in this embodiment, is a mainframe that has an interior provided with electronic components such as a motherboard, a hard disk, and an optical disk drive. The first body 10 includes a magnetically attractive component 11 which may be a metal piece or a magnet. The second body 20 is a display screen that is connected pivotally to the lateral side of the first body 10 and that covers openably the first body 10. The second body 20 includes a base wall 3, a magnetic element 2, and a fixing mechanism 30 to fix the magnetic element 2 on the base wall 3. The magnetic element 2 is a magnet that is disposed in a position corresponding to and that is attracted magnetically to the magnetically attractive component 11 when the second body 20 covers the first body 10. By virtue of magnetic attraction between the magnetic element 2 and the magnetically attractive component 11, the second body 20 can be positioned in a covering position that covers the first body 10.

The fixing mechanism 30 includes a frame 32, a retaining member, and a blocker 4. The frame 32 is connected to and cooperates with the base wall 3 to define a receiving space 34 for receiving the magnetic element 2, and has an opening 35 communicating with the receiving space 34 for insertion of the magnetic element 2 therethrough. The magnetic element 2 is moved along a first assembly direction (I) (see FIG. 3) into the receiving space 34 through the opening 35. The retaining member is connected to the base wall in proximity to the frame 32. The blocker 4 is engaged to the retaining member, blocks the opening 35, and abuts against the magnetic element 2 at a side that faces the opening 35. The retaining member retains the blocker 4 in a blocking position. Through this, the magnetic element 2 can be stably fixed in and prevented from escaping out of the receiving space 34.

Below is a detailed description of the structure and the assembly method of the fixing mechanism 30.

The frame 32 includes a stop wall 321 for stopping the magnetic element 2, two spaced-apart lateral walls 322 respectively connected to two opposite ends of the stop wall 321, and a cover wall 323 that is connected to the stop wall 321 and the lateral walls 322 opposite to and spaced apart from the base wall 3. The base wall 3, the stop wall 321, the lateral walls 322 and the cover wall 323 cooperatively define the receiving space 34 for receiving the magnetic element 2. The base wall 3, the lateral walls 322 and the cover wall 323 cooperatively define the opening 35 for insertion of the magnetic element 2 therethrough. Through this, the magnetic element 2 can move along the first assembly direction (I) into the receiving space 34 via the opening 35.

In this embodiment, the retaining member includes two spaced-apart retainers 33 engaged to the blocker 4 and respectively disposed in proximity to two opposite sides of the opening 35, so that engagement with the blocker 4 can be more stable. Further, the blocker 4 can be prevented from rotating relative to the base wall 3 and moving away from the opening 35. Moreover, this ensures that the blocker 4 can block the opening 35 and can abut against the magnetic element 2. In this embodiment, each of the retainers 33 includes a guide plate 331. The guide plates 331 of the retainers 33 are abuttable respectively against two opposite ends of the magnetic element 2 to guide sliding movement of the magnetic element 2 along the first assembly direction (I). This facilitates quick mounting of the magnetic element 2 into the receiving space 34 via the opening 35. Further, the guide plate 331 of each retainer 33 is spaced apart some distance from a respective lateral wall 322 of the frame 32. The guide plates 331 of the retainers 33 and the lateral walls 322 of the frame 32 cooperatively form a receiving channel 361 for receiving the blocker 4 along a second assembly direction (II) (see FIG. 4) that is transverse to the first assembly direction (I). When the blocker 4 is disposed in the receiving channel 361, the blocker 4 will block the opening 35 and abut against the magnetic element 2.

The blocker 4 includes a first block portion 41 received in the receiving channel 361 and abutting against the magnetic element 2, and two second block portions 42 respectively projecting from two opposite sides of the first block portion 41. The first block portion 41 has a rectangular shape. In this embodiment, the second block portions 42 are designed to abut respectively against outer faces 332 of the guide plates 331 so as to prevent the blocker 4 from sliding out of the receiving channel 361. It is worth mentioning that the second block portions 42 may be designed to abut respectively against inner faces 333 of the guide plates 331. Similarly, the effect of preventing the blocker 4 from sliding out of the receiving channel 361 may be achieved.

Moreover, to position the blocker 4 stably in the receiving channel 361, the guide plate 331 of each retainer 33 is formed with an engaging hole 334. Each second block portion 42 has a projection 421 projecting inwardly therefrom to engage the engaging hole 334 in the guide plate 331 of the respective retainer 33. Through this configuration, the blocker 4 can be stably positioned in the receiving channel 361 and can be prevented from sliding out of the receiving channel 361.

Figure 3:
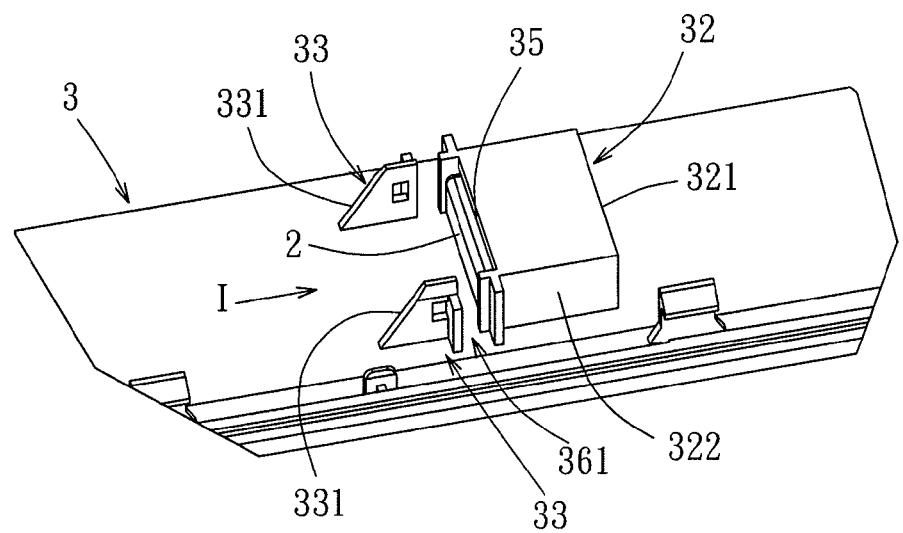
FIG. 3 is a perspective view of the fixing mechanism of the first embodiment, but without a blocker.
Figure 4:
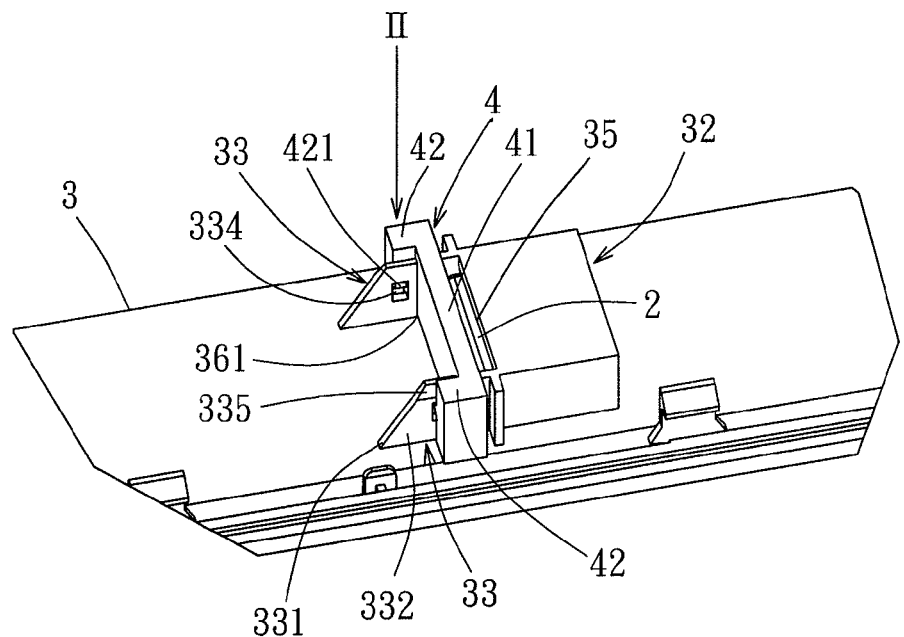
FIG. 4 is a perspective view of the fixing mechanism of the first embodiment in an assembled state.
Figure 5:
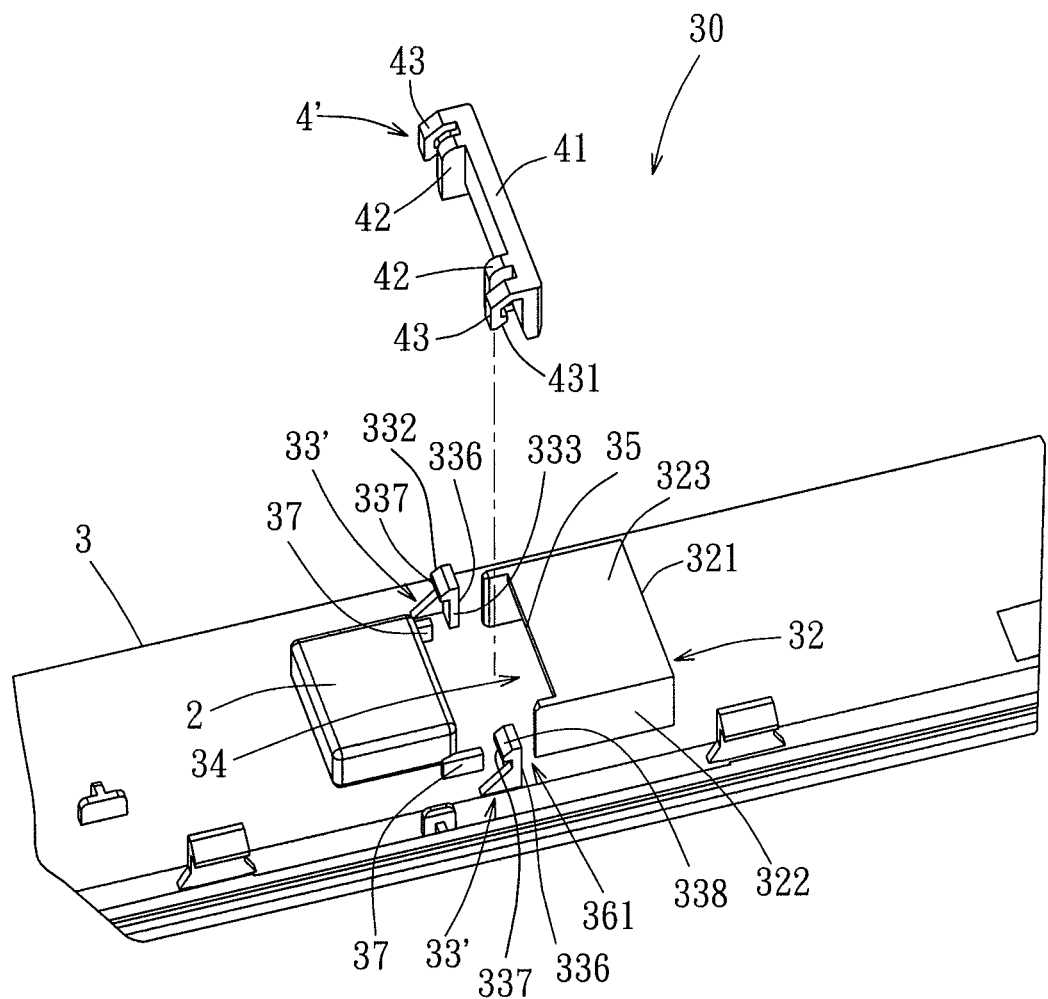
FIG. 5 is a partially exploded perspective view of a fixing mechanism of an electronic device according to the second embodiment of the present invention.

As shown in FIGS. 2 to 4, to fix the magnetic element 2 in the receiving space 34, the magnetic element 2 is first disposed in alignment with the opening 35, after which the magnetic element 2 is pushed to move along the first assembly direction (I). Through the guidance of the guide plates 331 of the retainers 33, the magnetic element 2 can easily and quickly pass through the opening 35 to move into the receiving space 34. Next, the blocker 4 is moved along the second assembly direction (II) into the receiving channel 361. Because the guide plate 331 of each retainer 33 has an inclined guide face 335 at an end of the outer face 332 that is distal from the base wall 3, during movement of the blocker 4 into the receiving channel 361 along the second assembly direction (II), the projections 421 of the second block portions 42 abut respectively against the inclined guide faces 335 of the respective retainers 33, and the second block portions 42 are pushed outwardly. As the projections 421 move past the respective inclined guide faces 335 until the blocker 4 abuts against the base wall 3, the projections 421 of the second block portions 42 can engage respectively the engaging holes 334 in the guide plates 331, thereby positioning stably the blocker 4 in the receiving channel 361. At this time, the blocker 4 blocks the opening 35, and abuts against a side of the magnetic element 2 that faces the opening 35. Hence, the magnetic element 2 is stably fixed in the receiving space 34.

When the electronic device 100 falls off accidentally or receives an external impact, the magnetic element 2 is likely to move in a direction opposite to the first assembly direction (I) and hit the blocker 4. Because the second assembly direction (II) of the blocker 4 is transverse to the first assembly direction (I) of the magnetic element 2, an escape direction of the blocker 4 from the receiving channel 361 is different from an escape direction of the magnetic element 2 from the receiving space 34. When the magnetic element 2 moves in the direction opposite to the first assembly direction (I) and hit the blocker 4, the blocker 4 can still be stably positioned in the receiving channel 361 and can restrict movement of the magnetic element 2 because the blocker 4 is blocked by the retainers 33. Through this, the blocker 4 is prevented from escaping out of the receiving channel 361 due to impact from the magnetic element 2, and the magnetic element 2 can also be prevented from escaping out of the receiving space 34.

Referring to FIGS. 5 to 8, an electronic device 100 according to the second embodiment of this invention is shown to have an overall structure and assembly method substantially similar to that of the first embodiment. The difference resides in the structure of the fixing mechanism 30.

Figure 6:
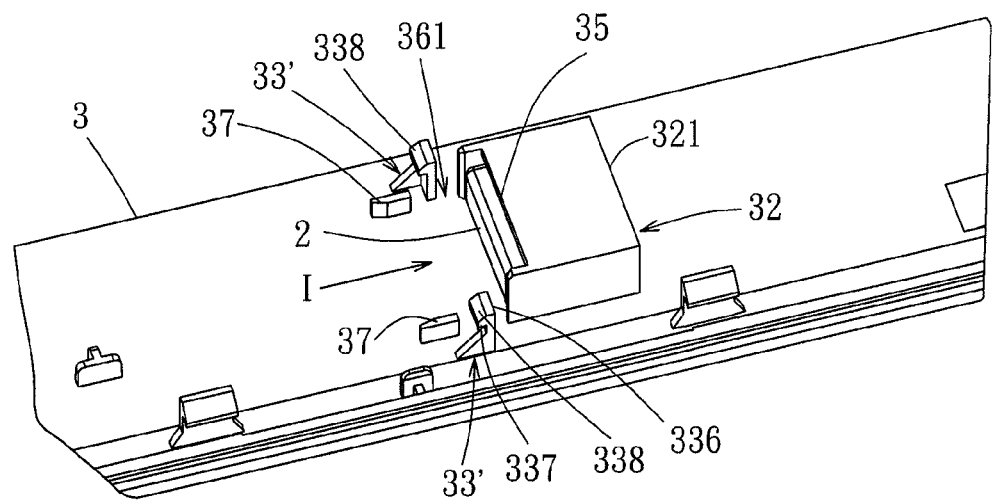
FIG. 6 is a perspective view of the fixing mechanism of the second embodiment, but without a blocker.

In this embodiment, a pair of spaced-apart guide blocks 37 are connected to the base wall 3 to guide sliding movement of the magnetic element 2 toward the receiving space 34 along the first assembly direction (I) (see FIG. 6). The second block portions 42 of the blocker 4' are designed to abut against the inner faces 333 of the respective retainers 33' to prevent the blocker 4' from sliding out of the receiving channel 361. Alternatively, the second block portions 42 may also be designed to abut against the outer faces 332 of the respective retainers 33'. Similarly, the effect of preventing the blocker 4' from sliding out of the receiving channel 361 can be achieved. Each retainer 33' includes an arm portion 336 connected to the base wall 3, and a hook portion 337 projecting from one end of the arm portion 336 that is distal from the base wall 3. The hook portion 337 faces a direction away from the receiving channel 361 and the opening 35. The blocker 4 further includes two engaging hooks 43 projecting respectively from two opposite sides of the first block portion 41. Each of the engaging hooks 43 is disposed outwardly of a respective second block portion 42 and is engageable with the hook portion 337 of the respective retainer 33'.

Figure 7:
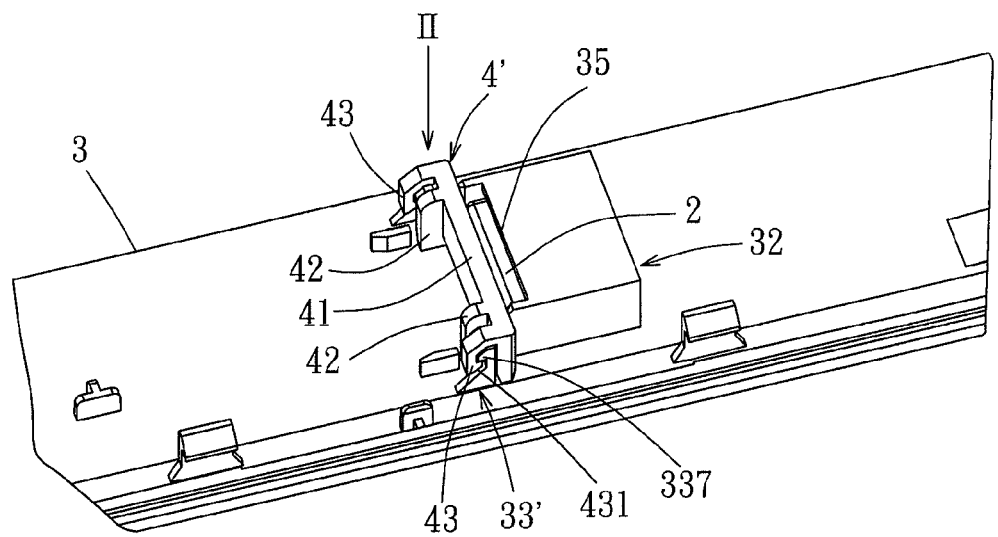
FIG. 7 is a perspective view of the fixing mechanism of the second embodiment in an assembled state.
Figure 8:
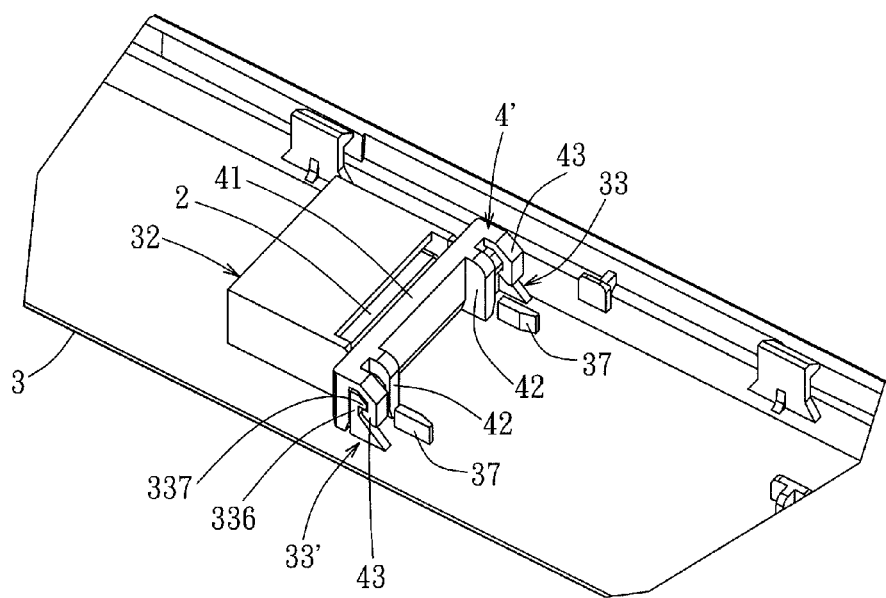
FIG. 8 is another assembled perspective view of the fixing mechanism of the second embodiment.

As shown in FIGS. 6 to 8, to fix the magnetic element 2 in the receiving space 34, the magnetic element 2 is first aligned with the opening 35, after which the magnetic element 2 is pushed along the assembly direction (I) toward the receiving space 34. Through the guidance of the guide blocks 37, the magnetic element 2 can easily and quickly pass through the opening 35 to move into the receiving space 34. Next, the blocker 4' is moved along the second assembly direction (II) into the receiving channel 361. Because the hook portion 337 of each retainer 33' has an inclined guide face 338 that extends downwardly and inclinedly therefrom, and because each engaging hook 43 has an inclined contact face 431 that extends upwardly and inclinedly therefrom, during the movement of the blocker 4' into the receiving channel 361 along the second assembly direction (II), the inclined contact faces 431 of the engaging hooks 43 abut respectively against the inclined guide faces 338 of the hook portions 337, and the engaging hooks 43 of the blocker 4' are pushed outwardly. As the inclined contact faces 431 of the engaging hooks 43 move past the inclined guide faces 338 of the respective hook portions 337 until the blocker 4' abuts against the base wall 3, the engaging hooks 43' can engage the hook portions 337 of the respective retainers 33', thereby positioning stably the blocker 4' in the receiving channel 361. At this time, the blocker 4' blocks the opening 35, and abuts against the side of the magnetic element 2 that faces the opening 35. Hence, the magnetic element 2 is stably fixed in the receiving space 34.

Figure 9:
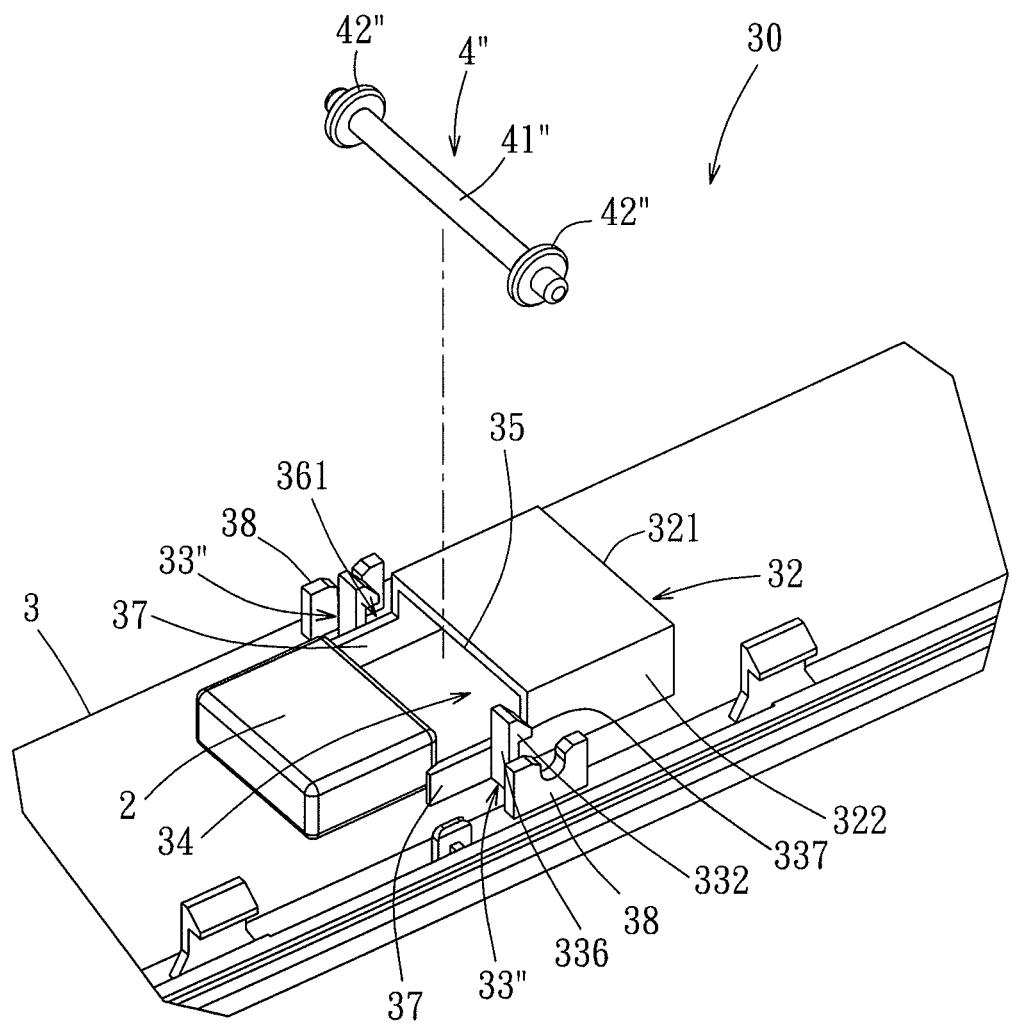
FIG. 9 is a partially exploded perspective view of a fixing mechanism of an electronic device according to the third embodiment of the present invention.
Figure 10:
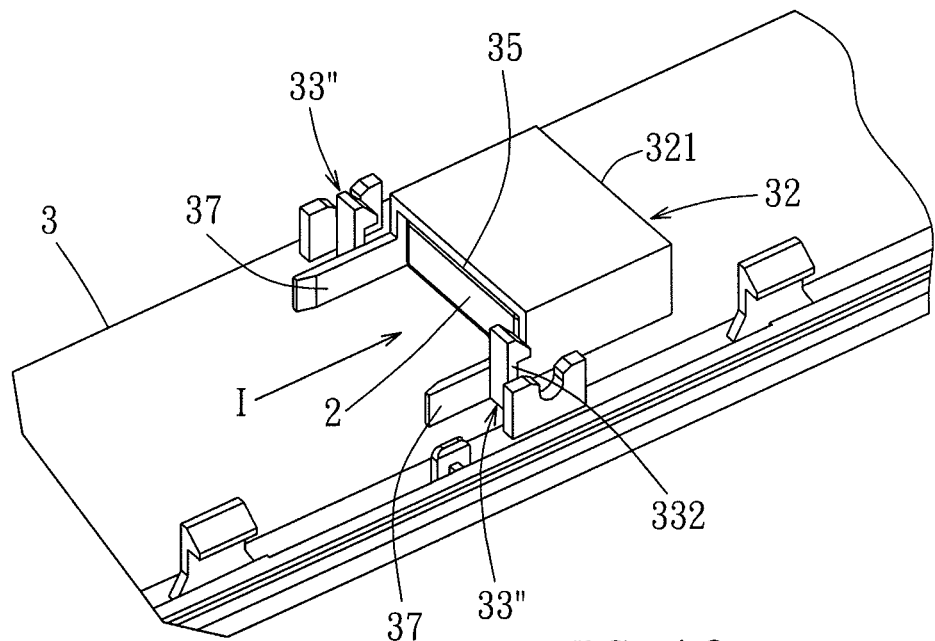
FIG. 10 is a perspective view of the fixing mechanism of the third embodiment, but without a blocker.
Figure 11:
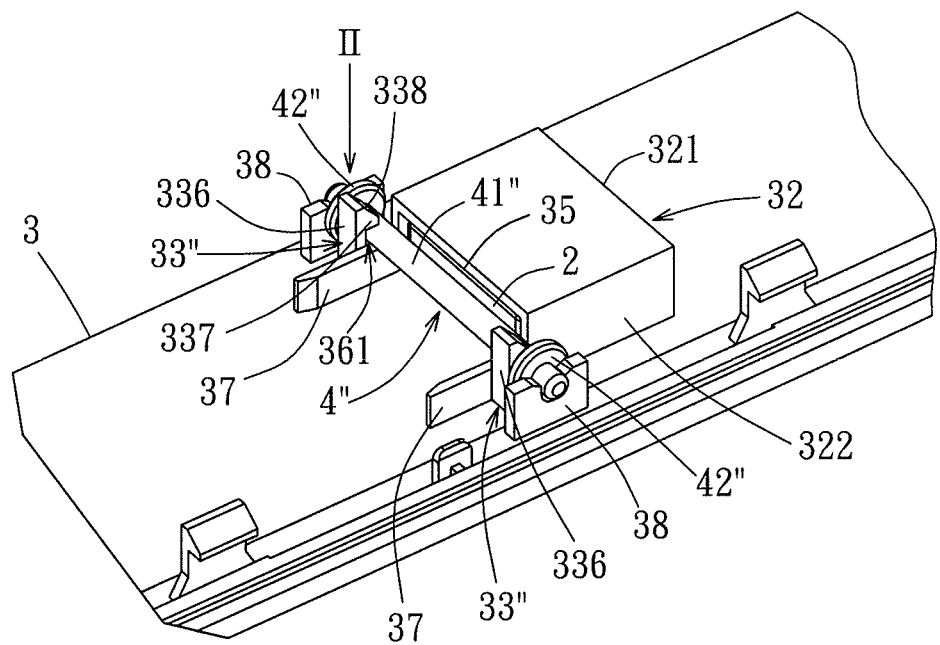
FIG. 11 is a perspective view of the fixing mechanism of the third embodiment in an assembled state.

Referring to FIGS. 9 to 11, an electronic device 100 according to the third embodiment of this invention is shown to have an overall structure and assembly method substantially similar to that of the first embodiment. The difference resides in the structure of the fixing mechanism 30.

In this embodiment, the first block portion 41" of the blocker 4" is cylindrical, and each of the second block portions 42" is configured as a circular flange that projects outwardly and radially from one end of the first block portion 41". The second block portions 42" abut respectively against the outer faces 332 of the respective retainers 33". A pair of guide blocks 37 are connected to the base wall 3 to guide sliding movement of the magnetic element 2 toward the receiving space 34 along the first assembly direction (I). The guide blocks 37 are connected respectively to the lateral walls 322 of the frame 32. Each of the retainers 33" is disposed outwardly of a respective guide block 37, and includes an arm portion 336 connected to the base wall 3, and a hook portion 337 projecting from one end of the arm portion 336 that is distal from the base wall 3. The hook portions 337 of the retainers 33" face the receiving channel 361. The arm portion 336 of each retainer 33" is abuttable against one end of the first block portion 41" that is opposite to the magnetic element 2. The hook portion 337 of each retainer 33" is engageable with another end of the first block portion 41 that is distal from the base wall 3.

As shown in FIGS. 9 to 11, to fix the magnetic element 2 in the receiving space 34, the magnetic element 2 is first aligned with the opening 35, after which the magnetic element 2 is pushed toward the receiving space 34 along the first assembly direction (I). Through the guidance of the guide blocks 37, the magnetic element 2 can easily and quickly pass through the opening 35 to move into the receiving space 34. Next, the blocker 4" is moved along the second assembly direction (II) into the receiving channel 361. Because the hook portion 337 of each retainer 33" has an inclined guide face 338 that extends downwardly and inclinedly therefrom, during movement of the blocker 4" into the receiving channel 361 along the second assembly direction (II), the first block portion 41" abuts against the inclined guide faces 338 of the hook portions 337, and the arm portions 336 of the retainers 33" are pushed outwardly. As the first block portion 41" moves past the inclined guide faces 338 of the hook portions 337 and abuts against the guide blocks 37, the retainers 33" can move inwardly, the arm portions 336 thereof can abut against the end of the first block portion 41" that is opposite to the magnetic element 2, and the hook portions 337 can engage the end of the first block portion 41" that is distal from the base wall 3. At this time, the blocker 4" is stably positioned in the receiving channel 361, blocks the opening 35, and abuts against the side of the magnetic element 2 that faces the opening 35. Hence, the magnetic element 2 is stably fixed in the receiving space 34.

Furthermore, a pair of support plates 38 are connected to the base wall 3 outwardly of the respective retainers 33" to support the first block portion 41" of the blocker 4". Through this, the support plates 38 and the guide blocks 37 can cooperatively support the first block portion 41" to thereby increase the stability of support. It is worth mentioning that each guide block 37 may be designed to be spaced apart from the respective lateral wall 332 of the frame 32, and the support plates 38 may be dispensed herewith, so that during assembly of the blocker 4" in the receiving channel 361, each second block portion 42" may directly abut against the base wall 3. The first block portion 41" can similarly achieve the effect of blocking the magnetic element 2.

Figure 12:
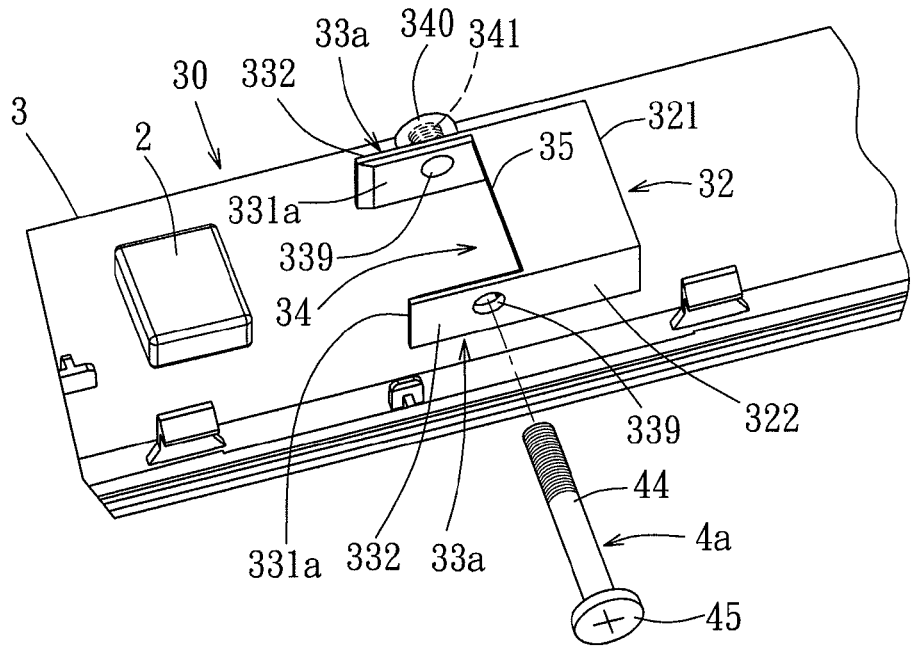
FIG. 12 is a partially exploded perspective view of a fixing mechanism of an electronic device according to the fourth embodiment of the present invention.
Figure 13:
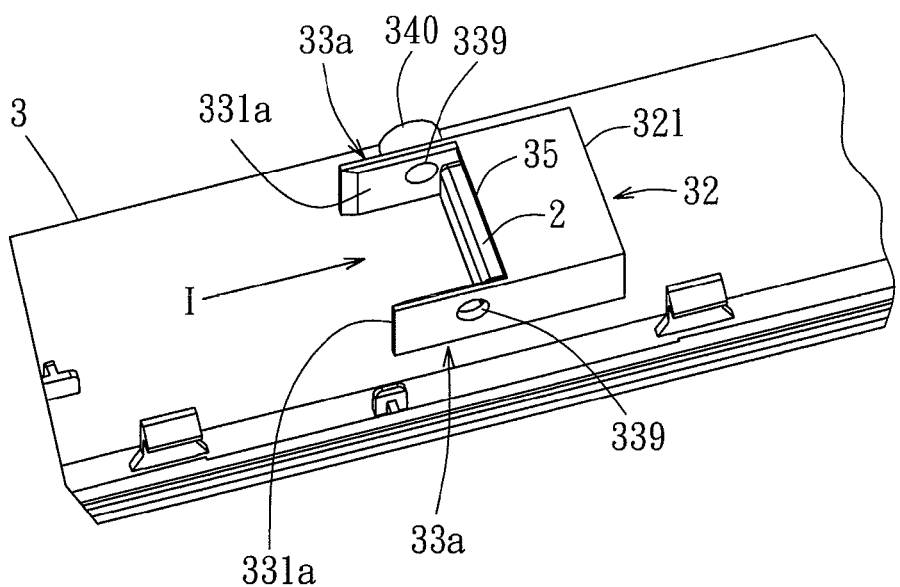
FIG. 13 is a perspective view of the fixing mechanism of the fourth embodiment, but without a blocker.
Figure 14:
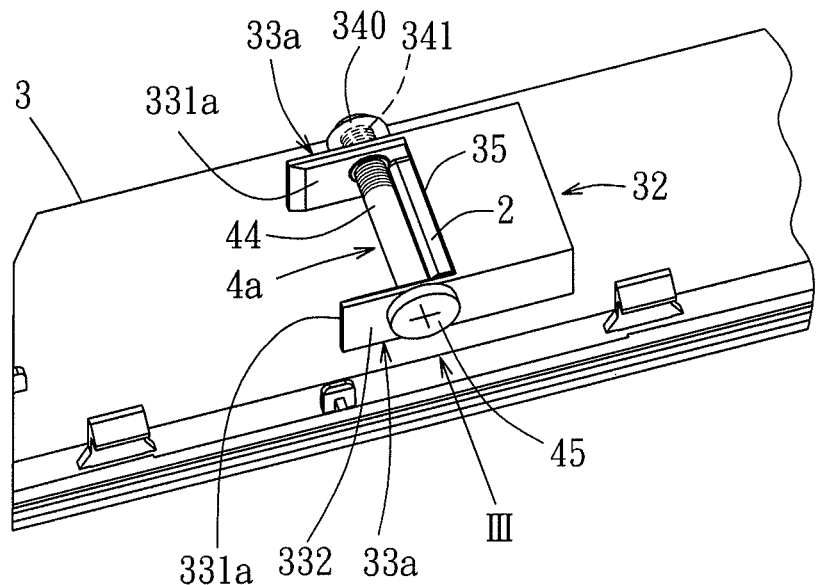
FIG. 14 is a perspective view of the fixing mechanism of the fourth embodiment in an assembled state.

Referring to FIGS. 12 to 14, an electronic device 100 according to the fourth embodiment of this invention is shown to have an overall structure and assembly method substantially similar to the first embodiment. The difference resides in the structure of the fixing mechanism 30.

In this embodiment, the guide plates (331a) of the retainers (33a) are connected respectively to the lateral walls 322 of the frame 32. Each guide plate (331a) is formed with a through hole 339. One of the retainers (33a) further includes a threaded nut 340 fixed to the outer face 332 of the guide plate 331 at a position corresponding to the through hole 339. The threaded nut 340 may be formed integrally as one piece with the guide plate (331a) of said one of the retainers (33a), or may be engaged to the guide plate (331a) of said one of the retainers (33a) using any suitable engaging method. The threaded nut 340 is formed with a threaded hole 341 communicating with the through hole 339. The blocker (4a) is configured as a bolt, and includes a threaded shank 44, and a head 45 connected to one end of the threaded shank 44. The threaded shank 44 is extendable through the through holes 339 in the guide plates (331a) to engage with the threaded hole 341 in the threaded nut 340. As such, the threaded shank 44 can abut against the magnetic element 2. The head 45 is abuttable against the outer face 332 of the guide plate 331 of the other retaining member (33a) to limit the depth of screwing of the threaded shank 44 in the threaded hole 341.

As shown in FIGS. 12 to 14, to fix the magnetic element 2 in the receiving space 34, the magnetic element 2 is first aligned with the opening 35, after which the magnetic element 2 is pushed toward the receiving space 34 along the first assembly direction (I). Through the guidance of the guide plates (331a) of the retainers (33a), the magnetic element 2 can easily and quickly pass through the opening 35 to move into the receiving space 34. Next, the threaded shank 44 of the blocker (4a) is moved along a third assembly direction (III) that is transverse to the first and second assembly directions (I, II), and is inserted through the through holes 339 in the guide plates (331a) and is fastened to the threaded hole 341 in the threaded nut 340. When the head 45 of the blocker (4a) abuts against the outer face 332 of the guide plate (331a) of said one of the retainers (33a), the assembly of the blocker (4a) is completed. At this time, the threaded shank 44 of the blocker (4a) blocks the opening 35, and abuts against the side of the magnetic element 2 that faces the opening 35. Hence, the magnetic element 2 is stably fixed in the receiving space 34.

Figure 15:
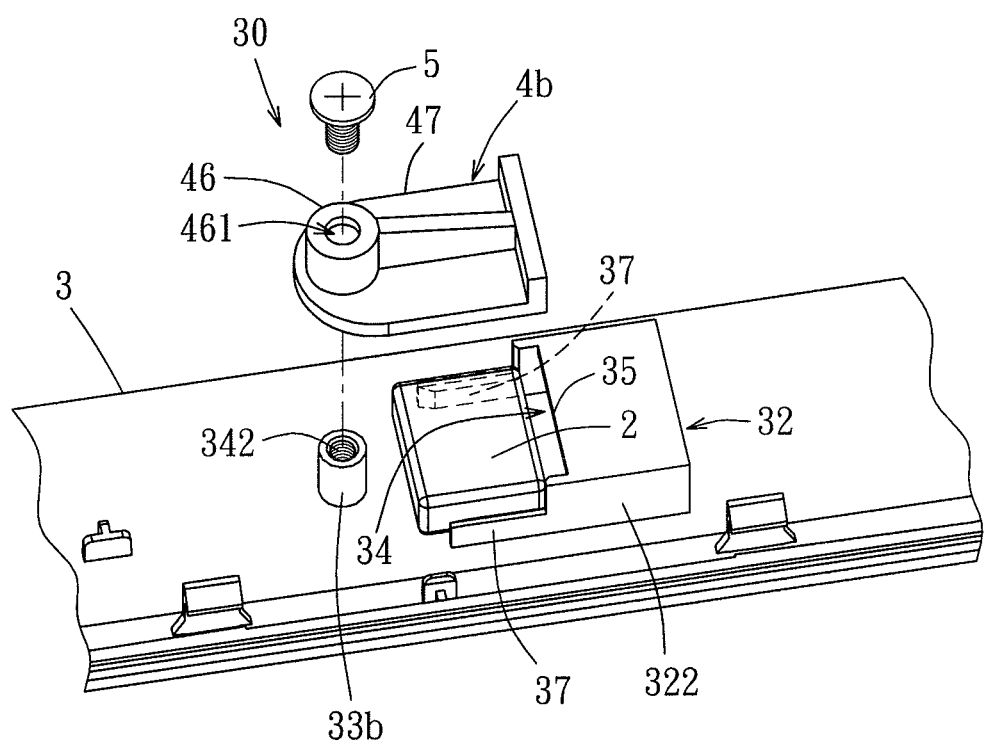
FIG. 15 is a partially exploded perspective view of a fixing mechanism of an electronic device according to the fifth embodiment of the present invention.
Figure 16:
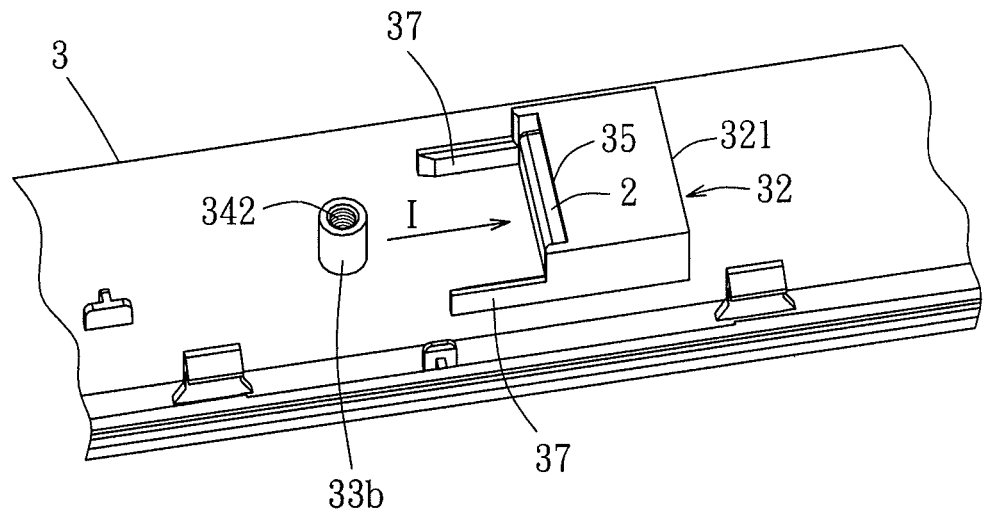
FIG. 16 is a perspective view of the fixing mechanism of the fifth embodiment, but without a blocker.
Figure 17:
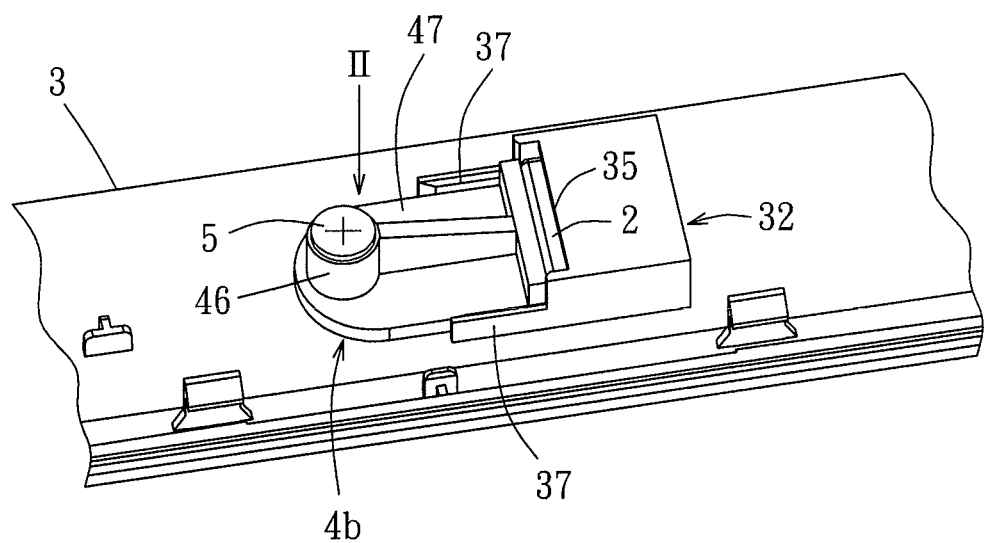
FIG. 17 is a perspective view of the fixing mechanism of the fifth embodiment in an assembled state.

Referring to FIGS. 15 to 17, an electronic device 100 according to the fifth embodiment of this invention is shown to have an overall structure and an assembly method substantially similar to that of the first embodiment. However, in this embodiment, the retaining member has only one retainer (33b). The retainer (33b) is spacedly aligned with the opening 35 of the frame 32, and has a tubular body formed with an internal screw hole 342. The blocker (4b) includes a plate portion 47, and a sleeve portion 46 projecting outwardly from the plate portion 47 and formed with a limiting hole 461 that extends through the plate portion 47. The fixing mechanism 30 further comprises a screw 5 that is extendable through the limiting hole 461 to engage the screw hole 342 so as to fix the blocker (4b) to the retainer (33b). Further, a pair of guide blocks 37 are connected to the base wall 3 to guide sliding movement of the magnetic element 2 toward the receiving space 34 along the first assembly direction (I). The guide blocks 37 are connected respectively to the lateral walls 322 of the frame 32, and are respectively abuttable against two opposite lateral sides of the plate portion 47. Through this, the blocker (4b) can be stably retained in a blocking position that abuts against the magnetic element 2.

As shown in FIGS. 15 to 17, to fix the magnetic element 2 in the receiving space 34, the magnetic element 2 is first aligned with the opening 35, after which the magnetic element 2 is pushed toward the receiving space 34 along the first assembly direction (I). Through the guidance of the guide blocks 37, the magnetic element 2 can easily and quickly pass through the opening 35 to move into the receiving space 34. Next, the sleeve portion 46 of the blocker (4b) is sleeved on the tubular body of the retainer (33b) along the second assembly direction (II). The screw 5 is also moved along the second assembly direction (II), is inserted through the limiting hole 461 in the sleeve portion 46, and engages the screw hole 342 in the retainer (33b), thereby fixing the blocker (4b) to the retainer (33b). At this time, the plate portion 47 of the blocker (4b) blocks the opening 35, and abuts against the side of the magnetic element 2 that faces the opening 35. Hence, the magnetic element 2 is stably fixed in the receiving space 34.

In sum, because of the simple structure of the fixing mechanism 30, the manufacturing costs and the assembly time of the electronic device 100 in each embodiment can be reduced to a minimum. Further, the fixing mechanism 30 can stably fix the magnetic element 2 in the receiving space 34, thereby preventing the magnetic element 2 from escaping out of the receiving space 34. Therefore, the object of this invention can be realized.

While the present invention has been described in connection with what are considered the most practical and embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A fixing mechanism for fixing a magnetic element on a base wall, said fixing mechanism comprising:
   a frame adapted to be connected to and adapted to cooperate with the base wall to define a receiving space for receiving the magnetic element, and an opening communicating with said receiving space for entry of the magnetic element into said receiving space along a first assembly direction;
   a retaining member adapted to be connected to the base wall in proximity to said frame; and
   a blocker engaged to said retaining member and blocking said opening.

2. The fixing mechanism as claimed in claim 1, wherein said retaining member includes two spaced-apart retainers disposed in proximity to said opening and engaged to said blocker.

3. The fixing mechanism as claimed in claim 2, wherein a receiving channel is formed between said retainer and said frame, said blocker being received in said receiving channel along a second assembly direction that is transverse to said first assembly direction.

4. The fixing mechanism as claimed in claim 2, wherein each of said retainers includes a guide plate for guiding the magnetic element to move toward said receiving space, said guide plate of each of said retainers being formed with a through hole, one of said retainers further including a threaded nut fixed to an outer face of said guide plate, said blocker including a threaded shank that extends through said through holes in said guide plates of said retainers and that engages said threaded nut, and a head connected to one end of said threaded shank and abutting against an outer face of said guide plate of the other one of said retainers, said threaded shank blocking said opening and being adapted to abut against the magnetic element.

5. The fixing mechanism as claimed in claim 1, wherein said retainer is spacedly aligned with said opening and is formed with a screw hole, said blocker including a limiting hole, said fixing mechanism further comprising a fastener that extends through said limiting hole and that engages said screw hole to fix said blocker to said retainer.

6. The fixing mechanism as claimed in claim 5, further comprising two spaced-apart guide blocks connected to two opposite sides of said frame for guiding the magnetic element to move toward said receiving space, said guide blocks abutting respectively against two opposite sides of said blocker.

7. A fixing mechanism for fixing a magnetic element on a base wall, said fixing mechanism comprising:
   a frame adapted to be connected to and adapted to cooperate with the base wall to define a receiving space for receiving the magnetic element, and an opening communicating with said receiving space for entry of the magnetic element into said receiving space along a first assembly direction;
   a retaining member adapted to be connected to the base wall in proximity to said frame and including two spaced-apart retainers disposed in proximity to said opening; and
   a blocker engaged to said retainers and blocking said opening;
   wherein a receiving channel is formed between said retainers and said frame; and
   wherein said blocker includes a first block portion received in said receiving channel along a second assembly direction that is transverse to said first assembly direction and adapted to abut against the magnetic element, and two second block portions respectively projecting from two opposite sides of said first block portion, each of said second block portions abutting against one of inner and outer faces of a respective one of said retainers.

8. The fixing mechanism as claimed in claim 7, wherein each of said retainers includes a guide plate for guiding the magnetic element to move toward said receiving space, said guide plate being formed with an engaging hole, each of said second block portions having a projection engaged to said engaging hole.

9. The fixing mechanism as claimed in claim 7, further comprising a pair of spaced-apart guide blocks adapted to be connected to the base wall for guiding the magnetic element to move toward said receiving space.

10. The fixing mechanism as claimed in claim 9, wherein each of said retainers includes an arm portion adapted to be connected to the base wall, and a hook portion projecting from one end of said arm portion away from said opening, said blocker further including two engaging hooks projecting respectively from said two opposite sides of said first block portion adjacent to said second block portions, respectively, said engaging hooks respectively engaging said hook portions of said retainers, each of said second block portions abutting against said inner face of the respective one of said retainers.

11. The fixing mechanism as claimed in claim 9, wherein each of said retainers includes an arm portion adapted to be connected to the base wall, and a hook portion projecting from one end of said arm portion toward said opening, said first block portion being cylindrical, each of said second block portions being configured as a circular flange projecting outwardly and radially from one end of said first block portion and abutting against said outer face of the respective one of said retainers.

12. An electronic device having a fixing mechanism, comprising:
    a first body including a magnetically attractive component; and
    a second body connected pivotally to and covering openably said first body, said second body including a base wall, a magnetic element attracted magnetically to said magnetically attractive component when said second body covers said first body, and a fixing mechanism including a frame connected to and cooperating with said base wall to define a receiving space that receives said magnetic element, and an opening communicating with said receiving space, said magnetic element being moved along a first assembly direction into said receiving space through said opening;
    a retaining member connected to said base wall in proximity to said frame; and
    a blocker engaged to said retaining member and blocking said opening.

13. The electronic device as claimed in claim 12, wherein said retaining member includes two spaced-apart retainers disposed in proximity to said opening and engaged to said blocker.

14. The electronic device as claimed in claim 13, wherein a receiving channel is formed between said retainer and said frame, said blocker being received in said receiving channel along a second assembly direction that is transverse to said first assembly direction.

15. The electronic device as claimed in claim 14, wherein said blocker includes a first block portion received in said receiving channel and abutting against said magnetic element, and two second block portions respectively projecting from two opposite sides of said first block portion, each of said second block portions abutting against one of inner and outer faces of a respective one of said retainers.

16. The electronic device as claimed in claim 15, wherein each of said retainers includes a guide plate guiding said magnetic element to move toward said receiving space, said guide plate being formed with an engaging hole, each of said second block portions having a projection engaged to said engaging hole.

17. The electronic device as claimed in claim 15, further comprising a pair of spaced-apart guide blocks connected to said base wall and guiding said magnetic element to move toward said receiving space.

18. The electronic device as claimed in claim 17, wherein each of said retainers includes an arm portion connected to said base wall, and a hook portion projecting from one end of said arm portion away from said opening, said blocker further including two engaging hooks projecting respectively from said two opposite sides of said first block portion adjacent to said second block portions, respectively, said engaging hooks respectively engaging said hook portions of said retainers, each of said second block portions abutting against said inner face of the respective one of said retainers.

19. The electronic device as claimed in claim 17, wherein each of said retainers includes an arm portion connected to said base wall, and a hook portion projecting from one end of said arm portion toward said opening, said first block portion being cylindrical, each of said second block portions being configured as a circular flange projecting outwardly and radially from one end of said first block portion and abutting against said outer face of the respective one of said retainers.

20. The electronic device as claimed in claim 13, wherein each of said retainers includes a guide plate guiding said magnetic element to move toward said receiving space, said guide plate of each of said retainers being formed with a through hole, one of said retainers further including a threaded nut fixed to an outer face of said guide plate, said blocker including a threaded shank that extends through said through holes in said guide plates of said retainers and that engages said threaded nut, and a head connected to one end of said threaded shank and abutting against an outer face of said guide plate of the other one of said retainers, said threaded shank blocking said opening and abutting against said magnetic element.

21. The electronic device as claimed in claim 12, wherein said retainer is spacedly aligned with said opening, said retainer being formed with a screw hole, said blocker including a limiting hole, said fixing mechanism further comprising a fastener that extends through said limiting hole and that engages said screw hole to fix said blocker to said retainer.

22. The electronic device as claimed in claim 21, further comprising two spaced-apart guide blocks connected to two opposite sides of said frame and guiding said magnetic element to move toward said receiving space, said guide blocks abutting respectively against two opposite sides of said blocker.

\* \* \* \* \*